United States Patent
Jeong et al.

(10) Patent No.: US 12,075,495 B2
(45) Date of Patent: Aug. 27, 2024

(54) APPARATUS AND METHOD FOR PROCESSING TRAFFIC OF SERVICE IN WIRELESS COMMUNICATION SYSTEM

(71) Applicant: Samsung Electronics Co., Ltd., Suwon-si (KR)

(72) Inventors: Sangsoo Jeong, Suwon-si (KR); Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/058,407

(22) Filed: Nov. 23, 2022

(65) Prior Publication Data
US 2023/0094746 A1  Mar. 30, 2023

Related U.S. Application Data

(63) Continuation of application No. 17/002,745, filed on Aug. 25, 2020, now Pat. No. 11,528,756.

(30) Foreign Application Priority Data

Aug. 26, 2019 (KR) ........................ 10-2019-0104688

(51) Int. Cl.
*H04W 76/10* (2018.01)
*H04W 92/24* (2009.01)

(52) U.S. Cl.
CPC ............ *H04W 76/10* (2018.02); *H04W 92/24* (2013.01)

(58) Field of Classification Search
CPC ..... H04W 76/10; H04W 92/24; H04W 24/02; H04W 88/14; H04W 76/12; H04W 88/18; H04W 80/10

See application file for complete search history.

(56) References Cited

U.S. PATENT DOCUMENTS

2018/0324646 A1  11/2018  Lee et al.
2019/0075431 A1   3/2019  Albasheir et al.
(Continued)

FOREIGN PATENT DOCUMENTS

KR  20190049508 A   5/2019
KR  20200141336 A  12/2020
(Continued)

OTHER PUBLICATIONS

Chen et al., "Method, Device and System for Selecting Session Management Function Network Element", Jan. 23, 2020, WO, English translation of WO 2020015503. (Year: 2020).*

(Continued)

*Primary Examiner* — Michael K Phillips

(57) ABSTRACT

Disclosed is a 5G or a pre-5G communication system provided to support a higher data transmission rate than that of post-4G communication systems such as LTE. A method of operating a network node in a wireless communication system includes: receiving, from at least one user plane function (UPF) instance, a registration request message including UPF profile information of the at least one UPF instance; storing the UPF profile information including UPF service support information for at least one UPF service supported by the at least one UPF instance, receiving, from a session management function (SMF) node, a UPF discovery request message including UPF service information; discovering one or more UPF instance based on the UPF profile information and the UPF service information; and transmitting, to the SMF node, UPF instance information for the one or more UPF instance.

8 Claims, 10 Drawing Sheets

(56) References Cited

U.S. PATENT DOCUMENTS

| | | | |
|---|---|---|---|
| 2019/0109823 A1 | 4/2019 | Qiao et al. | |
| 2019/0158408 A1 | 5/2019 | Li et al. | |
| 2019/0182875 A1 | 6/2019 | Talebi Fard et al. | |
| 2019/0215730 A1 | 7/2019 | Qiao et al. | |
| 2019/0313468 A1* | 10/2019 | Talebi Fard | H04W 60/04 |
| 2019/0394833 A1* | 12/2019 | Talebi Fard | H04W 68/005 |
| 2020/0053828 A1 | 2/2020 | Bharatia et al. | |
| 2020/0068587 A1* | 2/2020 | Garcia Azorero | H04W 76/10 |
| 2020/0084663 A1 | 3/2020 | Park et al. | |
| 2020/0107213 A1 | 4/2020 | Park et al. | |
| 2020/0389935 A1 | 12/2020 | Jeong et al. | |
| 2020/0413466 A1 | 12/2020 | Yu | |
| 2021/0176769 A1* | 6/2021 | Chou | H04L 41/40 |
| 2021/0377807 A1 | 12/2021 | Lee | |
| 2022/0015023 A1* | 1/2022 | De-Gregorio-Rodriguez | H04L 67/02 |
| 2022/0150685 A1* | 5/2022 | Chong | H04W 8/18 |
| 2022/0191294 A1* | 6/2022 | Yang | H04L 67/30 |
| 2022/0240089 A1* | 7/2022 | Bykampadi | H04W 12/08 |
| 2022/0295386 A1* | 9/2022 | Lu | H04L 67/51 |
| 2023/0179669 A1* | 6/2023 | Yang | H04L 41/40 709/201 |

FOREIGN PATENT DOCUMENTS

| | | |
|---|---|---|
| WO | WO-2020015503 A1 * | 1/2020 |
| WO | 2020034930 A1 | 2/2020 |
| WO | 2020224791 A1 | 11/2020 |

OTHER PUBLICATIONS

European Patent Office, "Supplementary European Search Report," dated Aug. 12, 2022, in connection with European Patent Application No. EP20858912.7, 10 pages.

3GPP TS 23.501 V16.1.0 (Jun. 2019) Technical Specification; 3rd Generation Partnership Project; Technical Specification Group Services and System Aspects; System Architecture for the 5G System; Stage 2 (Release 16); 368 pages.

Cisco Systems et al., "Corrections for support of Static IP Address," 3GPP TSG SA WG2 Meeting #134, S2-1907590, Jun. 23-29, 2019, Sapporo, Japan, 11 pages.

Nokia et al., "Using NRF for UPF discovery," SA WG2 Meeting #126, S2-182987, Feb. 26-Mar. 2, 2018, Montreal, Canada, 17 pages.

International Search Report and Written Opinion of the International Searching Authority in connection with International Application No. PCT/KR2020/011294 dated Dec. 3, 2020, 7 pages.

3GPP TS 29.510 V15.4.0 (Jun. 2019), Technical Specification, 3rd Generation Partnership Project; Technical Specification Group Core Network and Terminals; 5G System; Network Function Repository Services; Stage 3 (Release 15), Jun. 2019, 122 pages.

3GPP TR 23.742 V16.0.0 (Dec. 2018), Technical Report, 3rd Generation Partnership Project; Technical Specification Group Services and System Aspects; Study on Enhancements to the Service-Based Architecture (Release 16), Dec. 2018, 133 pages.

Nokia, et al., "Using NRF for UPF discovery," S2-182987 (revision of S2-182969), SA WG2 Meeting #126, Montreal, Canada Feb. 26-Mar. 2, 2018, 6 pages.

Notice of Preliminary Rejection dated Jul. 19, 2021, in connection with Korean Application No. 10-2019-0104688, 16 pages.

3GPP TR 23.742 V16.0.0 (Dec. 2018), Technical Report, 3rd Generation Partnership Project; Technical Specification Group Services and System Aspects; Study on Enhancements to the Service-Based Architecture (Release 16), Dec. 2018, 131 pages.

3GPP TS 29.510 V15.4.0 (Jun. 2019), Technical Specification, 3rd Generation Partnership Project; Technical Specification Group Core Network and Terminals; 5G System; Network Function Repository Services; Stage 3 (Release 15), Jun. 2019, 127 pages.

Notice of Patent Grant dated Dec. 9, 2021, in connection with Korean Application No. 10-2019-0104688, 3 pages.

* cited by examiner

APPARATUS AND METHOD FOR PROCESSING TRAFFIC OF SERVICE IN WIRELESS COMMUNICATION SYSTEM

CROSS-REFERENCE TO RELATED APPLICATIONS

This application is a continuation of application Ser. No. 17/002,745, now U.S. Pat. No. 11,528,756 issued Dec. 13, 2022, which is based on and claims priority under 35 U.S.C. 119 to Korean Patent Application No. 10-2019-0104688 filed on Aug. 26, 2019 in the Korean Intellectual Property Office, the disclosure of which are herein incorporated by reference in their entirety.

BACKGROUND

1. Field

The disclosure relates to a wireless communication system and, more particularly, to an apparatus and a method for processing traffic of a service in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

A 5G communication system considers supporting of more various services compared to the conventional 4G communication system. For example, services supported by the 5G system may include a ultra wide band mobile communication service (enhanced mobile broad band (eMBB)), a ultra-reliable and low latency communication service (ultra-reliable and low latency communication (URLLC)), a massive device-to-device communication service (massive machine-type communication (mMTC)), and a next-generation broadcast service (evolved multimedia broadcast/multicast service (eMBMS)).

The above information is presented as background information only to assist with an understanding of the disclosure. No determination has been made, and no assertion is made, as to whether any of the above might be applicable as prior art with regard to the disclosure.

SUMMARY

Based on the above background, the disclosure provides an apparatus and a method for processing service traffic in a wireless communication system.

In accordance with an aspect of the disclosure, a method of operating a network node is provided. The method includes: receiving, from at least one user plane function (UPF) instance, a registration request message including UPF profile information of the at least one UPF instance; storing the UPF profile information including UPF service support information for at least one UPF service supported by the at least one UPF instance; receiving, from a session management function (SMF) node, a UPF discovery request message including UPF service information; discovering one or more UPF instance based on the UPF profile information and the UPF service information; and transmitting, to the SMF node, UPF instance information for the one or more UPF instance.

In accordance with another aspect of the disclosure, a method of operating a Session Management Function (SMF) node in a wireless communication system is provided. The method includes: transmitting, to a network node, a user plane function (UPF) discovery request message including UPF service information; receiving, from the network node, UPF instance information for one or more UPF instance; and determining a UPF network including at least one UPF instance for a traffic of a UPF service.

In accordance with another aspect of the disclosure, a network node in a wireless communication system is provided. The network node includes: at least one transceiver; and at least one processor, wherein the at least one processor is configured to receive, from at least one user plane function (UPF) instance, a registration request message including UPF profile information of the at least one UPF instance, store the UPF profile information including UPF service support information for at least one UPF service supported by the at least one UPF instance, receive, from a session management function (SMF) node, a UPF discovery request message including UPF service information, discover one or more UPF instance based on the UPF profile information and the UPF service information, and transmit, to the SMF node, UPF instance information for the one or more UPF instance.

In accordance with another aspect of the disclosure, a Session Management Function (SMF) node in a wireless communication system is provided. The SMF node includes: at least one transceiver; and at least one processor, wherein the at least one processor is configured to transmit, to a network node, a UPF discovery request message including UPF service information; receive, from the network node, UPF instance information for one or more UPF instance; and determine a UPF network including at least one UPF instance for a traffic of a UPF service.

An apparatus and a method according to various embodiments can provide an apparatus and a method for processing of service traffic in a wireless communication system.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation: the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for processing traffic of a service in a wireless communication system.

Terms referring to a signal used in the following description, terms referring to a channel, terms referring to control information, terms referring to network entities, and terms referring to elements of a device are used only for convenience of description. Accordingly, the disclosure is not limited to those terms, and other terms having the same technical meanings may be used.

The terms for identifying an access node used in the following description, the term referring to an access node, the terms referring to a network entity or Network Functions (NFs), the terms referring to messages, the term referring to an interface between network entities, and the terms referring to various pieces of identification information are used for convenience of description. Therefore, the disclosure may not be limited by the terminologies provided below, and other terms that indicate subjects having equivalent technical meanings may be used.

Further, the disclosure describes various embodiments using the terms used in some communication standards (for example, $3^{rd}$-Generation Partnership Project (3GPP)), but this is only an example. Various embodiments may be easily modified and applied to other communication systems.

Figure 1:
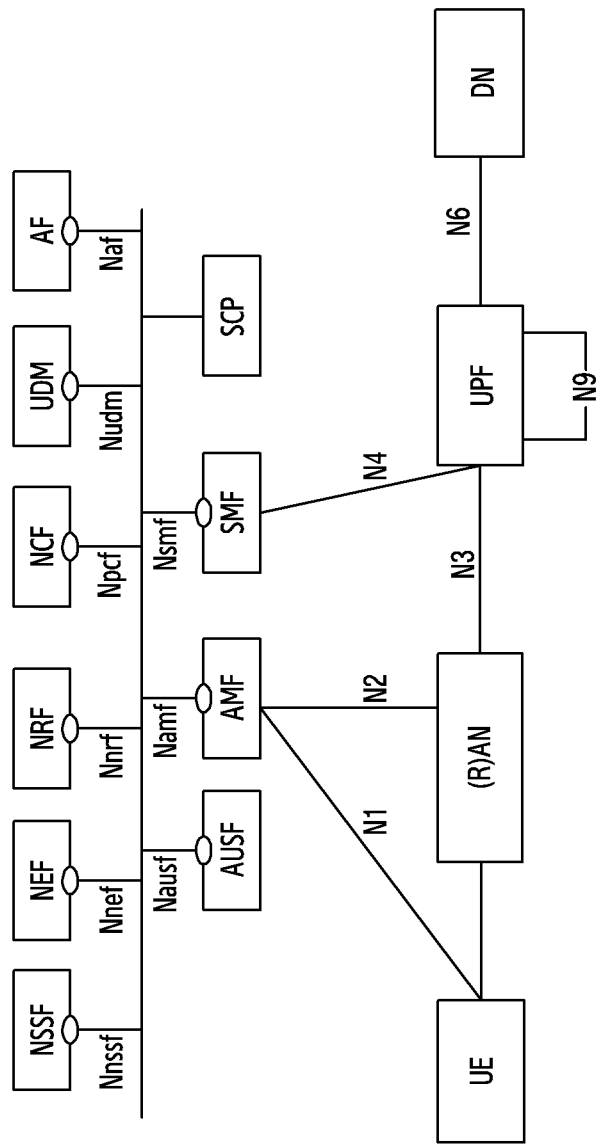
FIG. 1 illustrates an example of an SBA-based 5G system structure in a wireless communication system according to various embodiments of the disclosure.

FIG. 1 illustrates an example of an SBA-based 5G system structure in a wireless communication system according to various embodiments of the disclosure.

Referring to FIG. 1, an Access and Mobility management Function (AMF) is a Network Function (NF) for managing radio access and mobility of a UE. A Session Management Function (SMF) is an NF for managing a session of the UE, and session information includes Quality of Service (QoS) information, charging information, and information on packet processing. A User Plane Function (UPF) is an NF for processing user plane traffic, that is, a packet transmitted and received by a customer through a communication network, and is controlled by the SMF. Although not illustrated in FIG. 1, the 5G system may include an Unstructured Data Storage network Function (UDSF), and the UDSF is an NF for storing unstructured data and may store or retrieve any type of data according to a request from the NF.

Meanwhile, one of the structural characteristics of the communication network according to various embodiments is to separate a control plane NF for a 5G service such as the AMF and the SMF and a user plane for processing actual traffic. Particularly, processing of user traffic supported by the UPF, that is, packet processing may be divided into various detailed processing functions.

Basic packet processing: manages General Packet Radio System (GPRS) Tunneling Protocol-User plane (GTP-U) tunneling and transmits a packet between a Next Generation Radio Access Network (NG-RAN) and a Data Network (DN)

Packet detection: refers to a function for dividing packets to process the packets by the UPF and generally corresponds to a process of determining a flow to which a specific packet belongs on the basis of a source/destination address and a port included in an Internet Protocol (IP) header.

QoS enforcement: refers to a function of controlling a service quality such as bit rate control, packet gating of discarding or postponing transmission of a packet, flow marking of adding information on an identified flow to a packet on the basis of a packet detection result, and Service Class Indicator (SCI) addition of adding an identified service type to a packet Usage reporting: refers to a function of recording and reporting traffic usage/information such as a traffic volume, duration, and event and includes a supporting function for charging.

Packet buffering: refers to a function of buffering packets of a specific UE and reporting status information indicating arrival of the packets Multi-access supporting: refers to a function of simultaneously connecting to various types of access (access networks (5G and 4G, and 5G and Wi-Fi) and supporting the same Deep Packet Inspection (DPI): refers to a function of identifying a type of service/content by analyzing a packet in detail According to various embodiments, a Network Entity (NE)/Network Function (NF) (for example, a UPF or a Packet data network Gateway User Plane (PGW-UP)) for processing a user plane may simultaneously support all of the packet processing functions, modularize and separate detailed processing functions, and combine and operate the same. For example, traffic that does not need charging or multi-radio network access may be processed only by a packet processing function module that supports simply basic packet processing, and traffic of services that need charging may be processed further by a usage reporting function module. That is, one packet processing NE/NF having all packet processing functions makes optimal traffic processing suitable for various types of services difficult, makes ultra high-speed packet processing difficult, and deteriorates scalability according to a traffic increase/decrease. Accordingly, various embodiments propose a structure of separating a user plane packet processing function, allowing a capacity to increase/decrease for each module, and connecting processing modules suitable for a service characteristic to process a packet.

Hereinafter, in various embodiments, one packet processing function (module) is referred to as a UPF service, and the UPF service basically corresponds to each of various detailed packet processing functions described above. For example, a QoS enforcement function corresponds to a UPF QoS enforcement service. In addition to the various detailed packet processing functions described above, additional packet processing functions, for example, a Network Address Translation (NAT) function and a virtual LAN supporting function may be included.

One UPF instance may support one or more UPF services. If each UPF service is implemented in the form of an identifiable instance, the identifiable instance may be referred to as a UPF service instance. UPF service instances that provide the same service may be grouped as a UPF service set. UPF service instances belonging to one UPF service set may exchange or share context with each other and provide an equivalent service. Further, UPF instances that provide the same service may configure a UPF set, and UPF instances belonging to one UPF set may exchange or share context with each other and provide an equivalent service. Even when a UPF service or a UPF instance is changed according to movement of a UE or a change in a network state, UE service continuity (or IP address preservation) may be supported between UPF instances belonging to the same UPF service set or the same UPF set.

Meanwhile, the UPF instance is a UPF corresponding to an NF defined in the 3GPP standard which can be realized and identified. One UPF may support one or more UPF services, and UPF services may be separated and implemented as realized and identified UPF service instances. If the UPF is implemented as the UPF instance, the UPF service instance may be included in the UPF instance. Accordingly, in various embodiments, a UPF, a UPF instance, and a UPF service instance may be interchangeable with each other. For example, the term "UPF instance" may be interchangeable with the term "UPF service instance" in various embodiments.

Figure 2:
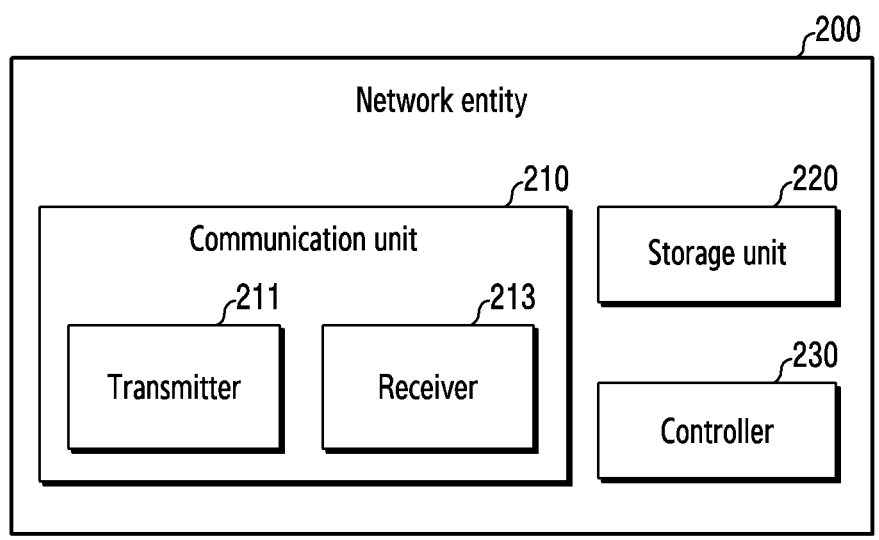
FIG. 2 illustrates the configuration of a network entity in a wireless communication system according to various embodiments.

FIG. 2 illustrates the configuration of a network entity in a wireless communication system according to various embodiments. The network entity according to the disclosure is a concept including a network function according to a system implementation. The term "~unit" or "~er" used hereinafter may refer to the unit for processing at least one function or operation and may be implemented in hardware, software, or a combination of hardware and software.

The network entity according to various embodiments may include a communication unit 210, a storage unit 220, and a controller 230 for controlling the overall operation of the network entity 200.

The communication unit 210 transmits and receives signals to and from other network entities. Accordingly, all or part of the communication unit 210 may be referred to as a "transmitter 211", a "receiver 213", or a "transceiver 210".

The storage unit 220 stores data such as a basic program, an application, and configuration information for the operation of the network entity 200. The storage unit 220 may include volatile memory, nonvolatile memory, or a combination of volatile memory and nonvolatile memory. The storage unit 220 provides stored data in response to a request from the controller 230.

The controller 230 controls the overall operation of the network entity 200. For example, the controller 230 transmits and receives a signal through the communication unit 210. The controller 230 records data in the storage unit 220 and reads the same. The controller 230 may perform the functions of a protocol stack required by the communication standard. To this end, the controller 230 may include a circuit, an application-specific circuit, at least one processor, or a micro processor, or may be a part of the processor. Further, the part of the communication unit 210 or the controller 330 may be referred to as a Communications Processor (CP). The controller 230 may control the network entity 200 to perform one operation according to various embodiments.

The communication unit 210 and the controller 230 should be necessarily implemented as separate modules but may be implemented as one element such as a single chip or software block. The communication unit 210, the storage unit 220, and the controller 230 may be electrically connected. The operations of the network entity 200 may be implemented by including the storage unit 220 for storing the corresponding program code within the network entity 200.

The network entity 200 may include a network node and may be one of base station (RAN), AMF, SMF, UPF, NF, NEF, NRF, CF, NSSF, UDM, AF, AUSF, SCP, UDSF, context storage, OAM, EMS, configuration server, and ID management server.

Figure 3:
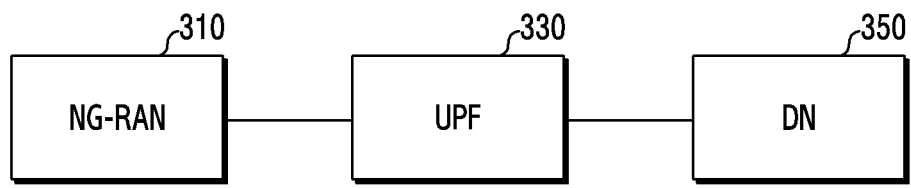
FIG. 3 illustrates an example of the configuration of connection to a UPF in a wireless communication system.

FIG. 3 illustrates an example of the connection configuration of a UPF in a wireless communication system.

Referring to FIG. 3, the connection configuration of a User Plane Function (UPF) 330 includes a Network Generation Radio Access Network (NG-RAN) (BS) 310, the UPF 330, and a Data Network (DN) 350.

The UPF 330 serves to transmit user traffic between the NG-RAN 310 and the DN 350. In a general case, one UPF 330 operates between the NG-RAN 310 and the DN 350 through a link therebetween, and two UPFs 330 may selectively operate for a specific situation such as roaming. In such a configuration, the UPF 330 should include all of the functions (charging and QoS control) for processing packets required by the communication network.

Figure 4:
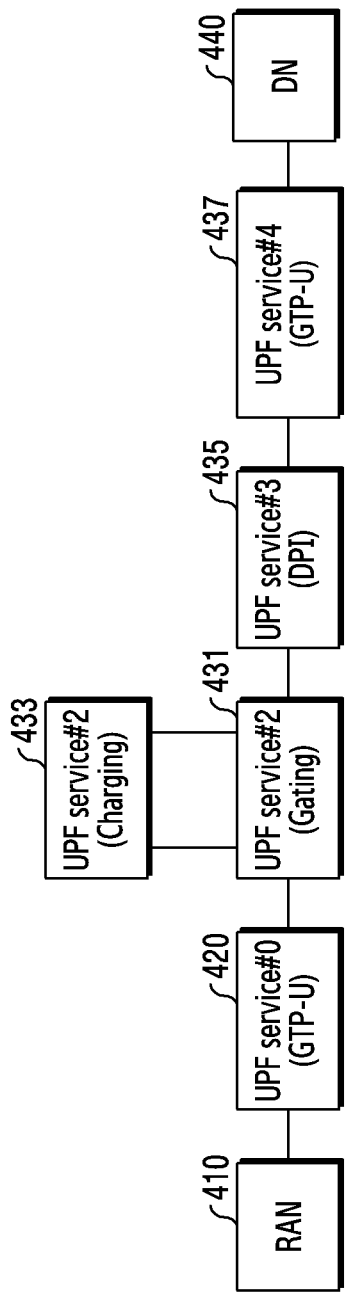
FIG. 4 illustrates an example of the connection (network) between UPF services according to various embodiments.

FIG. 4 illustrates an example (network) of the connection between UPF services according to various embodiments.

In FIG. 4, packet processing is supported through the connection (network) of UPF services having different functions rather than through one or two UFPs/GWs having the same function between a BS (RAN) 410 and a Data Network (DN) 440 unlike the connection of the user plane of FIG. 3. For example, when charging, Deep Packet Inspection (DPI), and QoS control are needed for a specific service (IP flow), traffic belonging to the corresponding service is processed by passing through physically separated UPF instances that provide the corresponding processing function.

Figure 5:
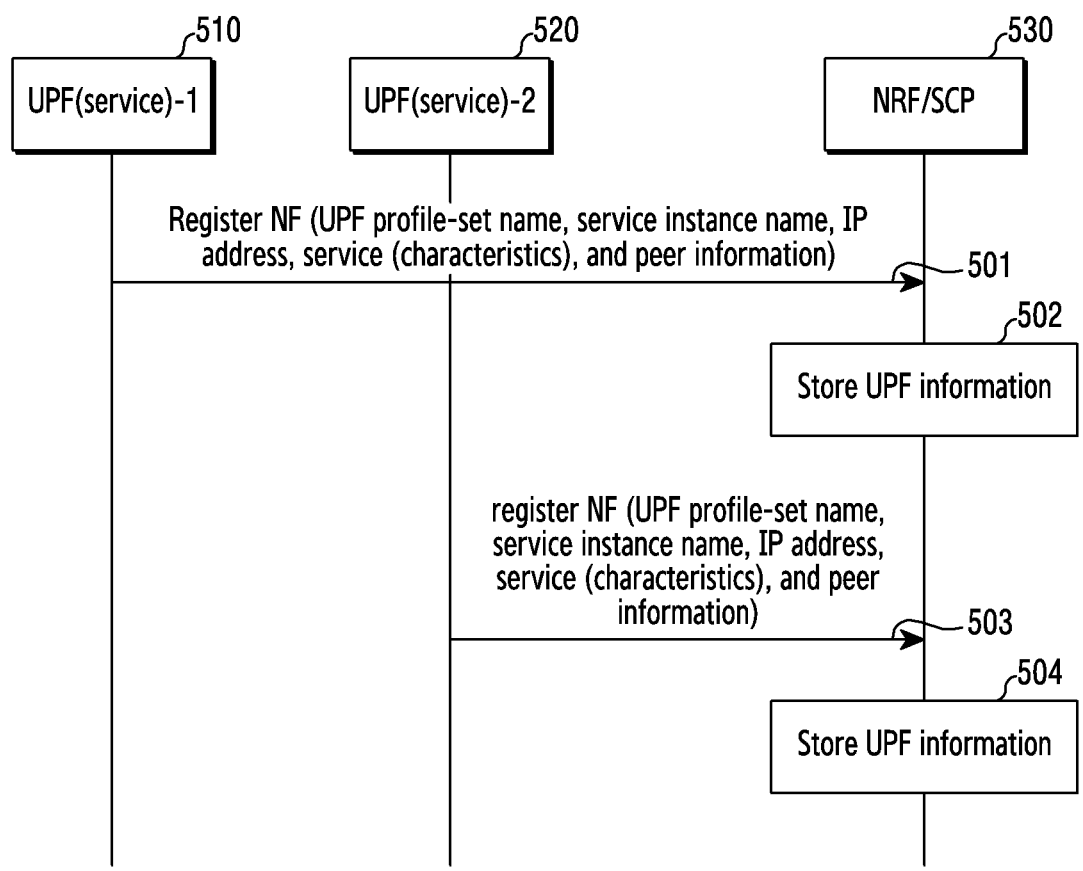
FIG. 5 illustrates a process of registering a UPF in a wireless communication system according to various embodiments.

FIG. 5 illustrates a process of registering a UPF in a wireless communication system according to various embodiments.

Referring to FIG. 5, according to various embodiments, at least one UPF instance 510 and 520 may register a UPF service supported by themselves and provide information, and thus allow another NF (for example, a Session Management Function (SMF) to call (request) the UPF service to process specific traffic. Although FIG. 5 illustrates the process of registering two UPF instances for convenience of description, the process may expand to two or more UPFs according to various embodiments.

In step 501, a first UPF (UPF-1) instance 510 performs a UPF service registration process with a Network Repository Function/Service Communication Proxy (NRF/SCP) 530 and transmits its own NF profile through a registration request message. The NF (UPF) profile basically includes an identifier of the first UPF (UPF-1) instance 510. According to various embodiments, the NF (UPF) profile may include information on one or more UPF services supported by the first UPF (UPF-1) instance 510. The UPF service information may include an identifier of the UPF service, a version of each service, and capability of each service. Further, the NF (UPF) profile may include information on a connection relationship with another UFP instance to which the first UPF (UPF-1) instance 510 is connected to process traffic, that is, peer information. The information on the connection relationship with another UPF instance, that is, peer information may specifically include one or more of an identifier of a UPF set which can be connected to the first UPF (UPF-1) instance 510, an identifier of the UPF instance, a relationship (transmission/reception/bi-direction), an Internet Protocol (IP) address, and a port number, and may be configured for each UPF (set or instance) which can be linked. Further, the NF (UPF) profile may include an identifier of a UPF set to which the first UPF (UPF-1) instance 510 belongs, an IP address(es) of the first UPF (UPF-1) instance 510, and a port number.

In step 502, the NRF/SCP 530 stores information received from the first UPF (UPF-1) instance 510, marks the first UPF (UPF-1) instance 510 with an available UPF, and uses the same for UPF service selection and discovery processes occurring later. In FIG. 5, a response message which the NRF/SCP 530 transmits to the first UPF (UPF-1) instance 510 is omitted.

In step 503, a second UPF (UPF-2) instance 520 performs a UPF service registration process with an NRF/SCP 530 and transmits its own NF profile through a registration request message. The NF (UPF) profile basically includes an identifier of the second UPF (UPF-2) instance 520. According to various embodiments, the NF (UPF) profile may include information on one or more UPF services supported by the second UPF (UPF-2) instance 520. Further, the NF (UPF) profile may include information on a connection relationship with another UFP instance to which the second UPF (UPF-2) instance 520 is connected to process traffic, that is, peer information. In addition, the NF (UPF) profile may include an identifier of a UPF set to which the second UPF (UPF-2) instance 520 belongs and an IP address(es) of the second UPF (UPF-2) instance 520. The information on the connection relationship with another UPF instance, that is, peer information may specifically include one or more of an identifier of a UPF set which can be connected to the second UPF (UPF-2) instance 520, an identifier of the UPF instance, a relationship (transmission/reception/bi-direction), an IP address, and a port number, and may be configured for each UPF (set or instance) which can be linked.

In step 504, the NRF/SCP 530 stores information received from the second UPF (UPF-2) instance 520, marks the second UPF (UPF-2) instance 520 with an available UPF, and uses the same for UPF service selection and discovery processes occurring later. In FIG. 5, a response message which the NRF/SCP 530 transmits to the second UPF (UPF-2) instance 520 is omitted.

Figure 7:
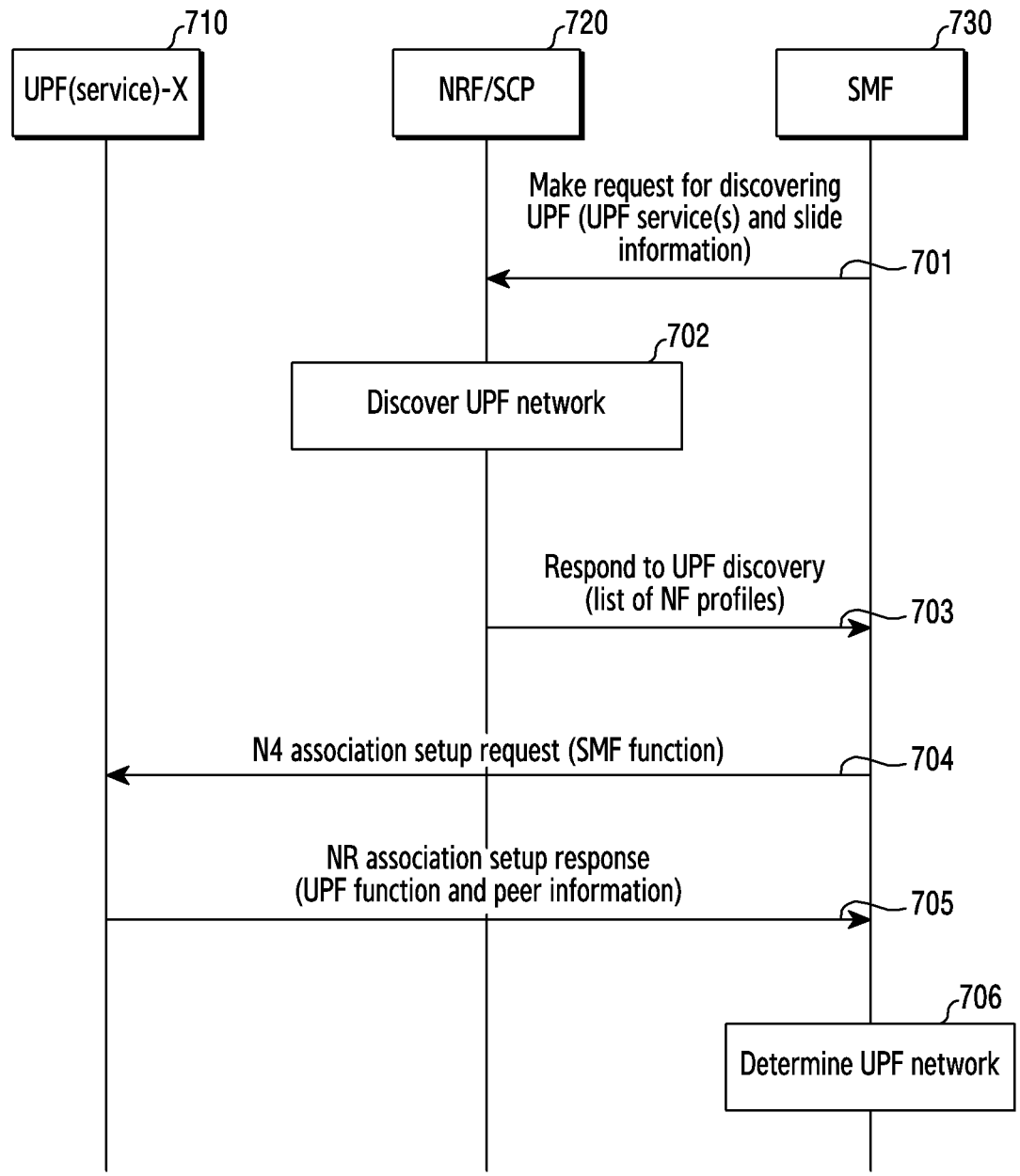
FIG. 7 illustrates a process of selecting and linking a UPF instance that may provide traffic processing of a specific session in a wireless communication system according to various embodiments.
Figure 8:
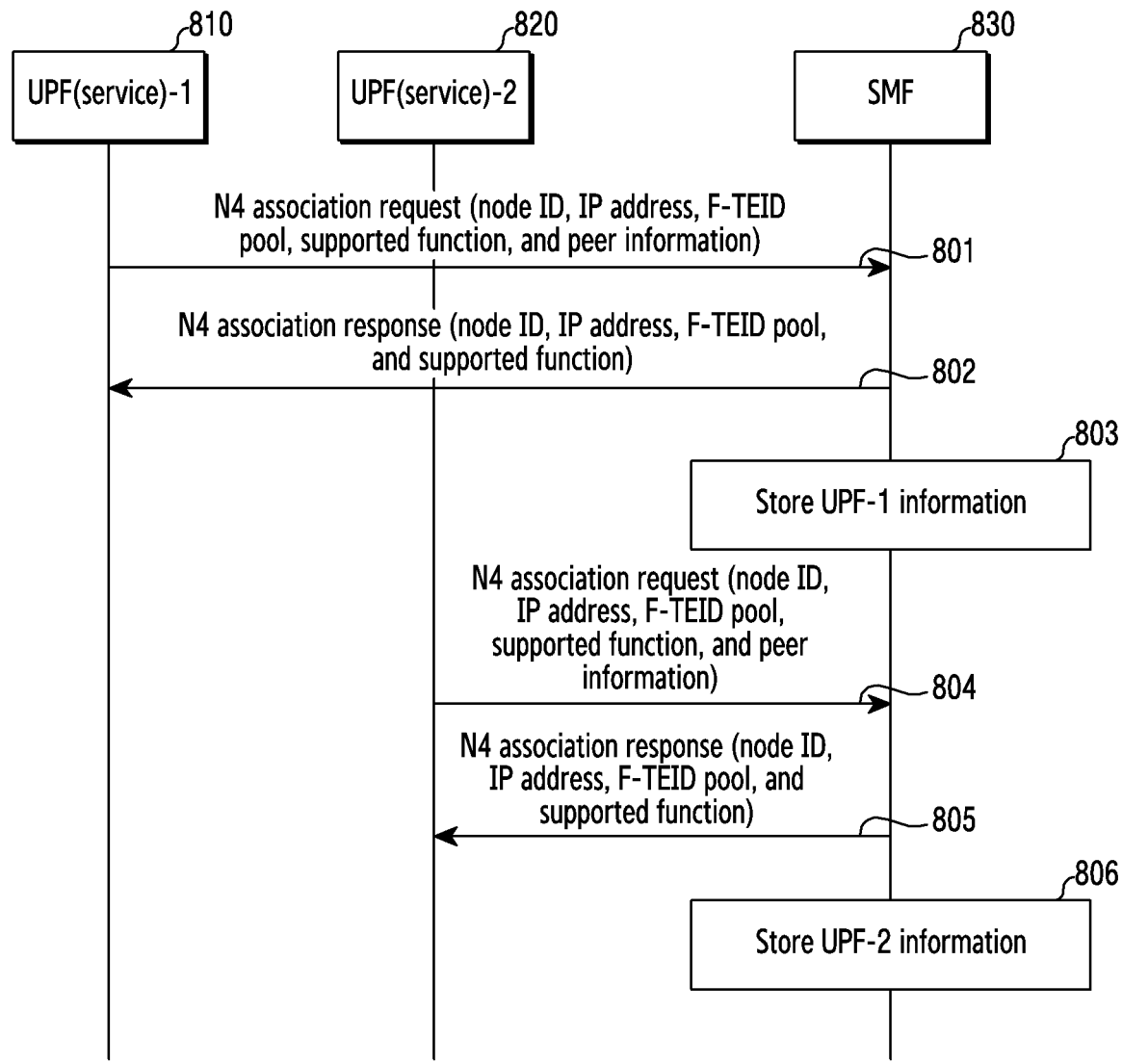
FIG. 8 illustrates a process of selecting and linking a UPF instance for providing traffic processing of a specific session in a wireless communication system according to various embodiments.

Hereinafter, embodiments of FIGS. 6 and 7 may be selectively performed after the embodiment of FIG. 5 or 8 is performed. That is, after the UPF service registration is performed through the embodiment of FIG. 5, the UPF instance for providing traffic processing of a specific session may be selected and linked through the embodiment of FIG. 6 or 7. Alternatively, after information on the UPF service is received and stored through the embodiment of FIG. 8, the UPF instance for providing traffic processing of a specific session may be selected and linked through the embodiment of FIG. 6 or 7.

Figure 6:
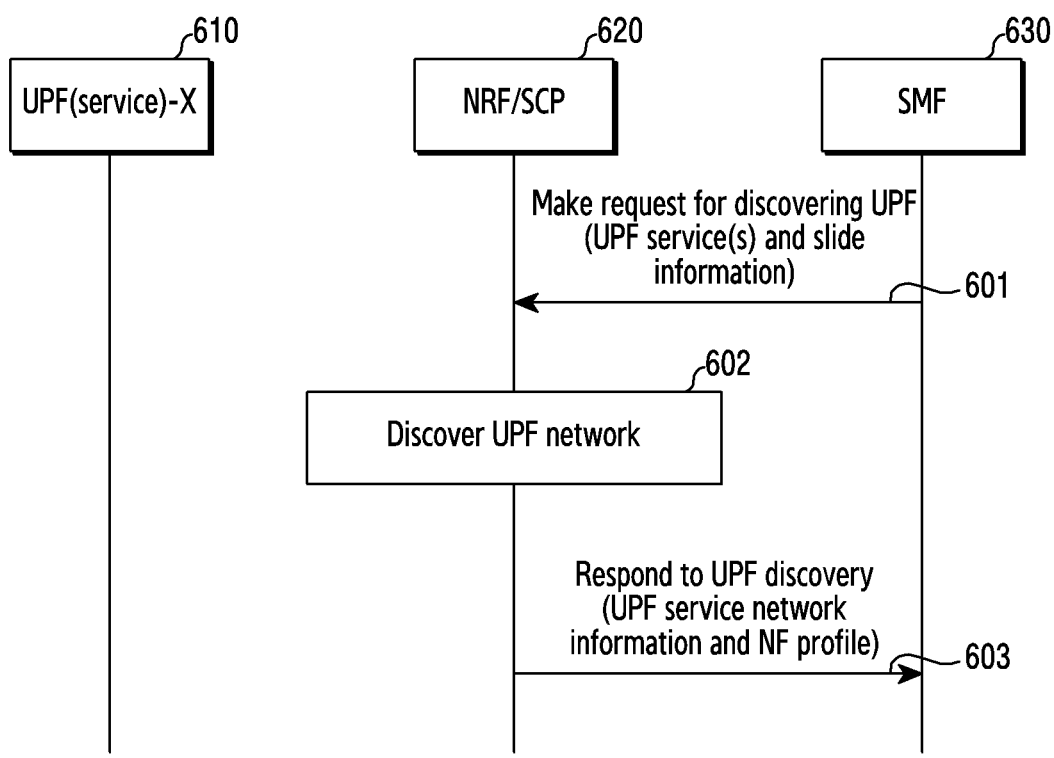
FIG. 6 illustrates a process of selecting and linking a UPF instance for providing traffic processing of a specific session in a wireless communication system according to various embodiments.

FIG. 6 illustrates a process of selecting and linking a UPF instance for providing traffic processing of a specific session in a wireless communication system according to various embodiments.

Although FIG. 6 illustrates a process of selecting one UPF instance for convenience of description, the processes of FIG. 6 may be repeated for each UPF instance when two or more UPF instances should be linked to process traffic as illustrated in the embodiment of FIG. 8.

In step 601, a consumer NF (for example, an SMF 630) performs a process of discovering and selecting a UPF instance with an NRF/SCP 620 to receive a user plane packet processing service. That is, the consumer NF 630 transmits a UPF discovery request message including UPF service(s) and slide information to the NRF/SCP 620.

Specifically, the consumer NF 630 transmits a discovery request message including a UPF service name required by the consumer NF, an expected NF type (a UPF in this embodiment), and an NF type of the consumer NF (for example, an SMF) to the NRF/SCP 620. If the consumer NF 630 has the information when making the request, the corresponding request message may additionally include an identifier of a UPF set and an identifier of a UPF service set. Further, if the requested UPF instance should be connected to the already selected UPF instance, the request message may include information on the UPF instance to be connected (an identifier of the UPF instance and the use of connection relationship information, that is, peer information).

In the embodiment of FIG. 6, the NRF/SCP 620 receives connection relationship information, that is, peer information during the UPF service registration process of FIG. 5. Accordingly, the NRF/SCP 620 may determine a UPF instance, that is, a peer to be connected to each instance and service and provide information.

In step 602, the NRF/SCP 620 discovers a UPF instance that may support discovery-requested UPF service(s). That is, the NRF/SCP 620 discovers a UPF network including at least one UPF instance that may support requested UPF service(s).

In step 603, the NRF/SCP 620 transfers information on the UPF instance that may support requested UPF service(s) to the consumer NF 630. That is, the NRF/SCP 620 transmits a UPF discovery response message including UPF service network information and a list of NF profiles to the consumer NF 630.

When two or more UPF instances supporting the corresponding UPF service(s) are configured to be linked to each other unlike discovery between general control plane NFs, information corresponding to a response of the NRF/SCP 620 may include both information on two or more UPF instances and link information between two or more UPF instances. The link information may include information on the connection (IP network or link) between two or more UPF instances, a direction in which a packet is exchanged between two or more UPF instances, and a sequence in a transmission path between two or more UPF instances, and connection relationship information, that is, peer information received during the UPF service registration process may be used or information received through separate Operations and Management (OAM) may be used for the link between the UPF instance and discovery of the configuration of an optimal UPF instance.

FIG. 7 illustrates a process of selecting and linking a UPF instance that may provide traffic processing of a specific session in a wireless communication system according to various embodiments.

Although FIG. 7 illustrates the process of selecting one UPF instance for convenience of description, the processes of FIG. 7 may be repeated for each UPF instance when two or more UPF instances should be linked to process traffic as illustrated in the embodiment of FIG. 5.

In step 701, a consumer NF (for example, an SMF 730) performs a process of discovering and selecting a UPF instance with an NRF/SCP 720 to receive a user plane packet processing service. That is, the consumer NF 730 transmits a UPF discovery request message including UPF service(s) and slide information to the NRF/SCP 720.

Specifically, the consumer NF 730 transmits a discovery request message including a UPF service name required by the consumer NF, an expected NF type (a UPF in this embodiment), and an NF type of the consumer NF (for example, an SMF) to the NRF/SCP 920. If the consumer NF 630 has the information when making the request, the corresponding request message may additionally include an identifier of a UPF set and an identifier of a UPF service set. Further, if the requested UPF instance should be connected to the already selected UPF instance, the request message may include information on the UPF instance to be connected (the use of connection relationship information, that is, peer information).

In the embodiment of FIG. 7, the NRF/SCP 720 may not receive connection relationship information, that is, peer information during the UPF service registration process of FIG. 5 or has a difficulty in determining and providing a UPF instance, that is, a peer to be connected to each UPF instance and service. In the embodiment of FIG. 7, the determination of the link between UPF instances should be performed by an SMF 730.

In step 702, the NRF/SCP 720 discovers a UPF instance that may support discovery-requested UPF service(s). That is, the NRF/SCP 720 discovers a combination of UPFs or a UPF network including at least one UPF instance that may support requested UPF service(s).

In step 703, the NRF/SCP 720 transfers information on the UPF instance that may support requested UPF service(s) to the consumer NF 730. That is, the NRF/SCP 720 transmits a UPF discovery response message including a list of NF profiles to the consumer NF 730.

When two or more UPF instances supporting the corresponding UPF service(s) are configured to be linked to each other unlike discovery between general control plane NFs, information corresponding to a response of the NRF/SCP 720 may include all of the information on two or more UPF instances. In order to make the link between the UPF instances and discover the optimal UPF instance configuration, the connection relationship information, that is, the peer information received during the UPF service registration process may be used or information received through separate Operations and Management (OAM) may be used.

Steps 704 and 705 may be described for one UPF instance and may be repeatedly performed if a plurality of UPF instances is needed.

In step 704, the consumer NF (for example, an SMF) 730 transmits a request for generating N4 (interface between the SMF and the UPF) (Packet Forwarding Control Protocol (PFCP) association) association to the UPF instance 710 through a discovery response received from the NRF/SCP 720. The N4 (PFCP) association setup request message transmitted by the consumer NF 730 may include capability supported by the consumer NF 730, an identifier of the consumer NF 730, and peer information of another UPF which should be linked. That is, the consumer NF 730 transmits the N4 association setup request message including an SMF to the UPF instance 710.

In step 705, the UPF instance 710 transmits again an N4 association setup response message to the consumer NF 730. The N4 association setup response message may include UPF services supported by the consumer NF 730, capability of the UPF instance, and connection relationship information, peer information of another UPF instance which can be linked to the UPF instance 710. The connection relationship information, that is, peer information of another UPF instance which can be linked may specifically include information on the connection (IP network or link) with another UPF instance, a direction in which a packet is exchanged with another UPF instance, and a sequence in a transmission path between UPF instances, and for information on another UPF instance, information received from the consumer NF 730 may be used, connection relationship information, that is, peer information requested and received from the NRF/SCP 720 may be used, or information received through separate Operations and Management (OAM) may be used. That is, the UPF instance 710 transmits the NR association setup response message including the UPF and the peer information to the consumer NF 730.

In step 706, the consumer NF 730 determines UPF instances for processing traffic on the basis of information received through the UPF instance 710. That is, the consumer NF 730 determines a UPF network including at least one UPF instance for processing traffic of requested UPF service(s).

Although the embodiment of FIG. 7 has been described on the basis of exchange of information during the N4 association process for management at a node level between the consumer NF (for example, the SMF) 730 and the UPF instance, exchanging of the same information may be performed during a process of establishing a session for actual traffic transmission, for example, an N4 session establishment process or through separate N4 message exchange.

The embodiment of FIG. 8 below may be selectively performed along with the embodiments of FIGS. 5 and 6 or the embodiments of FIGS. 5 and 7. That is, a UPF instance for providing traffic processing of a specific session may be selected and linked through the embodiment of FIG. 8. When the embodiment of FIG. 8 is combined with the embodiments of FIGS. 5 and 6 or the embodiments of FIGS. 5 and 7, the embodiment of FIG. 8 may be used to acquire detailed information of the UPF (NF profile and peer information of the UPF) or link to the UPF instance in order to perform actual traffic processing.

FIG. 8 illustrates a process of selecting and linking a UPF instance for providing traffic processing of a specific session in a wireless communication system according to various embodiments.

Although FIG. 8 illustrates two UPF instances for convenience of description, this embodiment may be equally applied to three or more UPF instances.

In step 801, a first UPF (UPF-1) instance 810 performs a process of generating N4 (PFCP) association with an SMF 830 which can be linked to the first UPF (UPF-1) instance 810. Step 801 may be performed when the UPF-1 instance 810 is initialized, or when status information of the UPF-1 instance 810 is changed or configured by an operator. In step 801, specifically, the UPF-1 instance 810 may include an identifier of the UPF-1 instance 810, an IP address supported by the UPF-1 instance 810, a set of Fully qualified Tunnel Endpoint Identifiers (F-TEIDs) which can be supported by the UPF-1 instance 810, capability supported by the UPF-1 instance 810, UPF services supported by the UPF-1 instance 810, and information on a peer UPF which can be linked to the UPF-1 instance 810 in the N4 association setup request message transmitted to the SMF 830. The connection relationship information, that is, peer information may specifically include one or more of an identifier of a UPF set which can be connected to the UPF-1 instance 810, an identifier of the UPF instance, a relationship (transmission/reception/bi-direction), and an IP address, and may be configured for each UPF (set or instance) which can be linked. Further, an identifier of the UPF set to which the UPF instance belongs and IP address(es) of UPF instance(s) may be included. That is, the UPF-1 instance 810 transmits the N4 association request message including a node ID, an IP address, an F-TEID pool, a supported function, and peer information to the SMF 830.

In step 802, the SMF 830 processes the N4 association setup request received from the UPF-1 instance 810 and transmits an N4 association setup response message. In step 803, the SMF 830 stores the information received from the UPF-1 instance 810. The N4 association setup response message is an N4 (PFCP) association setup response. The N4 association setup response message may include information on the SMF 830, for example, an identifier of the SMF 830, an IP address of the SMF 830, a set of Fully qualified Tunnel Endpoint Identifiers (F-TEIDs) which can be supported by the SMF 830, and capability supported by the SMF 830. That is, the SMF 830 transmits the N4 association response message including a node ID, an IP address, an F-TEID pool, and a supported function to the UPF-1 instance 810. Further, the SMF 830 stores information on the UPF-1 instance 810.

In step 804, the second UPF (UPF-2) instance 820 performs a process of generating N4 (PFCP) association with the SMF 830 which can be linked to the second UPF (UPF-2) instance 820. Step 804 may be performed when the UPF-2 instance 820 is initialized, or when status information of the UPF-2 instance 820 is changed or configured by an operator. In step 804, specifically, the UPF-2 instance 820 may include an identifier of the UPF-1 instance 820, an IP address supported by the UPF-2 instance 820, a set of Fully qualified Tunnel Endpoint Identifiers (F-TEIDs) which can be supported by the UPF-2 instance 820, capability supported by the UPF-2 instance 820, UPF services supported by the UPF-2 instance 820, and information on a peer UPF which can be linked to the UPF-2 instance 820 in the N4 association setup request message transmitted to the SMF 830. The connection relationship information, that is, peer information may specifically include one or more of an identifier of a UPF set which can be connected to the UPF-2 instance 820, an identifier of the UPF instance, a relationship (transmission/reception/bi-direction), and an IP address, and may be configured for each UPF (set or instance) which can be linked. Further, an identifier of the UPF set to which the UPF instance belongs and IP address(es) of UPF instance(s) may be included. That is, the UPF-2 instance 820 transmits the N4 association request message including a node ID, an IP address, an F-TEID pool, a supported function, and peer information to the SMF 830.

In step 805, the SMF 830 processes the N4 association setup request received from the UPF-2 instance 820 and transmits an N4 association setup response message. In step 806, the SMF 830 stores the information received from the UPF-2 instance 820. The N4 association setup response message is an N4 (PFCP) association setup response. The N4 association setup response message may include information on the SMF 830, for example, an identifier of the SMF 830, an IP address of the SMF 830, a set of Fully qualified Tunnel Endpoint Identifiers (F-TEIDs) which can be supported by the SMF 830, and capability supported by the SMF 830. That is, the SMF 830 transmits the N4 association response message including a node ID, an IP address, an F-TEID pool, and a supported function to the UPF-2 instance 820. Further, the SMF 830 stores information on the UPF-2 instance 820.

An embodiment of FIG. 9 below may be performed after the embodiments of FIGS. 5 and 6, the embodiments of FIGS. 5 and 7, or the embodiment of FIG. 8 described above are performed. That is, after the UPF instance for providing traffic processing of a specific session is selected and linked through the embodiments FIGS. 5 and 6, the embodiments of FIGS. 5 and 7, or the embodiment of FIG. 8, an N4 session corresponding to establishment or modification of a PDU session may be established through the embodiment of FIG. 9.

Figure 9:
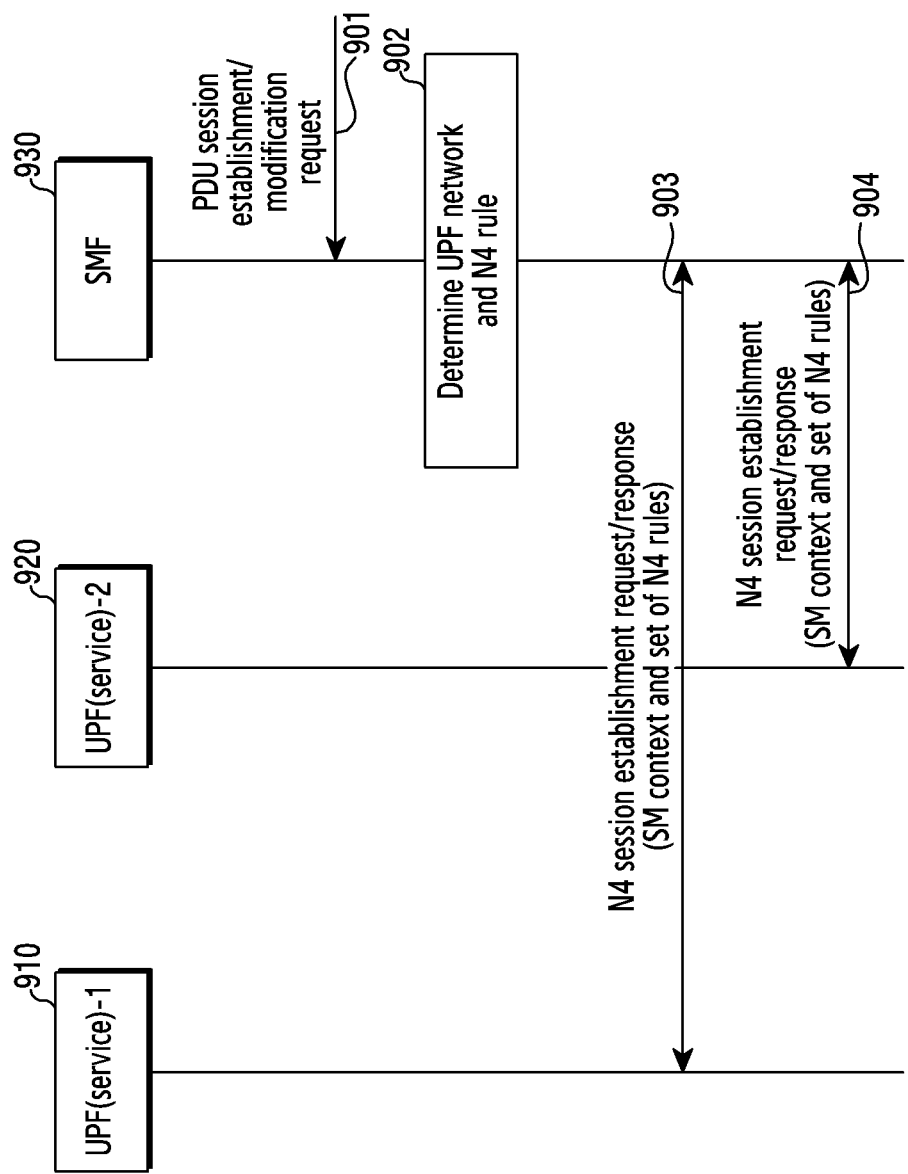
FIG. 9 illustrates a process of establishing an N4 session corresponding to establishment or changing of a PDU session in a wireless communication system according to various embodiments.

FIG. 9 illustrates a process of establishing an N4 session corresponding to establishment or modification of a PDU session in a wireless communication system according to various embodiments.

Although FIG. 9 illustrates two UPF instances for convenience of description, this embodiment may be equally applied to three or more UPF instances.

In step 901, an SMF 930 receives a PDU session establishment/modification request message. The UE may need to establish a new PDU session or an addition/modification of a UPF instance may be needed during modification of a PDU session. Step 901 may be performed by reception of a message indicating the generation of a request or modification for a new session from an AMF by the SMF 930, by information received from a PCF/UDM by the SMF 930, or by triggering according to a state of the SMF 930.

In step 902, the SMF 930 performs a process of selecting UPF instances for establishing/modifying a PDU session and establishing a session on the basis of information on UFP instances received in the previous step. That is, the SMF 930 determines a UPF network including at least one UPF instance which may support the PDU session of which establishment/modification is requested and determines N4 rules.

The embodiment of FIG. 9 is described on the basis of the use of a UPF service supported by a UPF-1 instance 910 and a UPF-2 instance 920 for the corresponding UE and session.

Although not illustrated in FIG. 9, three or more UPF instances, for example, the UPF-1 instance 910, the UPF-2 instance 920, and a UPF-3 instance which is not illustrated may perform service registration in the SMF 930. In this case, the SMF 930 may select the UFP-1 instance 910 and the UPF-2 instance 920 to establish/modify the PDU session among from the UFP-1 instance 910, the UPF-2 instance 920, and the UFP-3 instance in step 902.

In step 903, the SMF 930 generates an N4 rule to use the UPF service of the UPF-1 instance 910 selected in step 902 and transfers the same to the UPF-1 instance 910. The N4 rule may contain information and rules required for a specific UPF service, and may include a packet detection rule for detecting a packet (or IP flow) as a target, a rule for an action for each UPF service (for example, in the case of QoS enforcement, a detailed parameter for QoS enforcement), and a rule for transferring a packet to another node (a linked UPF, a data network, or a RAN). Further, basic context of the corresponding session is included. Upon receiving the N4 rule, the UPF-1 instance 910 stores the received N4 rule, transmits the response message to the SMF 930 again, and performs a traffic processing operation using the received N4 rule and context. That is, the UPF-1 instance 910 and the SMF 930 exchanges the N4 session establishment request message/response message including Session Management (SM) context and a set of N4 rules.

In step 904, the SMF 930 generates an N4 rule to use the UPF service of the UPF-2 instance 920 selected in step 902 and transfers the same to the UPF-2 instance 920. The N4 rule may contain information and rules required for a specific UPF service, and may include a packet detection rule for detecting a packet (or IP flow) as a target, a rule for an action for each UPF service (for example, in the case of QoS enforcement, a detailed parameter for QoS enforcement), and a rule for transferring a packet to another node (a linked UPF, a data network, or a RAN). Further, basic context of the corresponding session is included. Upon receiving the N4 rule, the UPF-9 instance 920 stores the received N4 rule, transmits the response message to the SMF 930 again, and performs a traffic processing operation using the received N4 rule and context. That is, the UPF-2 instance 920 and the SMF 930 exchanges the N4 session establishment request message/response message including Session Management (SM) context and a set of N4 rules.

When a specific packet is processed, the packet should sequentially pass through the UFP-1 instance 910 and the UPF-2 instance 920, N4 rules which the SMF 930 transmits to the UPF-1 instance 910 in step 903 may include not only a rule for an operation of processing a packet which should be processed by the UPF-1 instance 910 but also a transmission rule indicating that the packet should be transmitted to the UPF-2 instance 920. According to various embodiments, when one UPF instance performs the operation of processing two or more packets, N4 rules which the SMF 930 generates and transmits to the UPF instance may include a value for identifying sequences (or priorities) of the N4 rules.

When packet transmission/reception and information exchange for General Packet Radio System (GPRS) Tunneling Protocol-User plane (GTP-U) between two UPF instances 910 and 920 are needed after steps 903 and 904, additional signaling and information exchange between the two UPF instances 910 and 920 may be generated.

Figure 10:
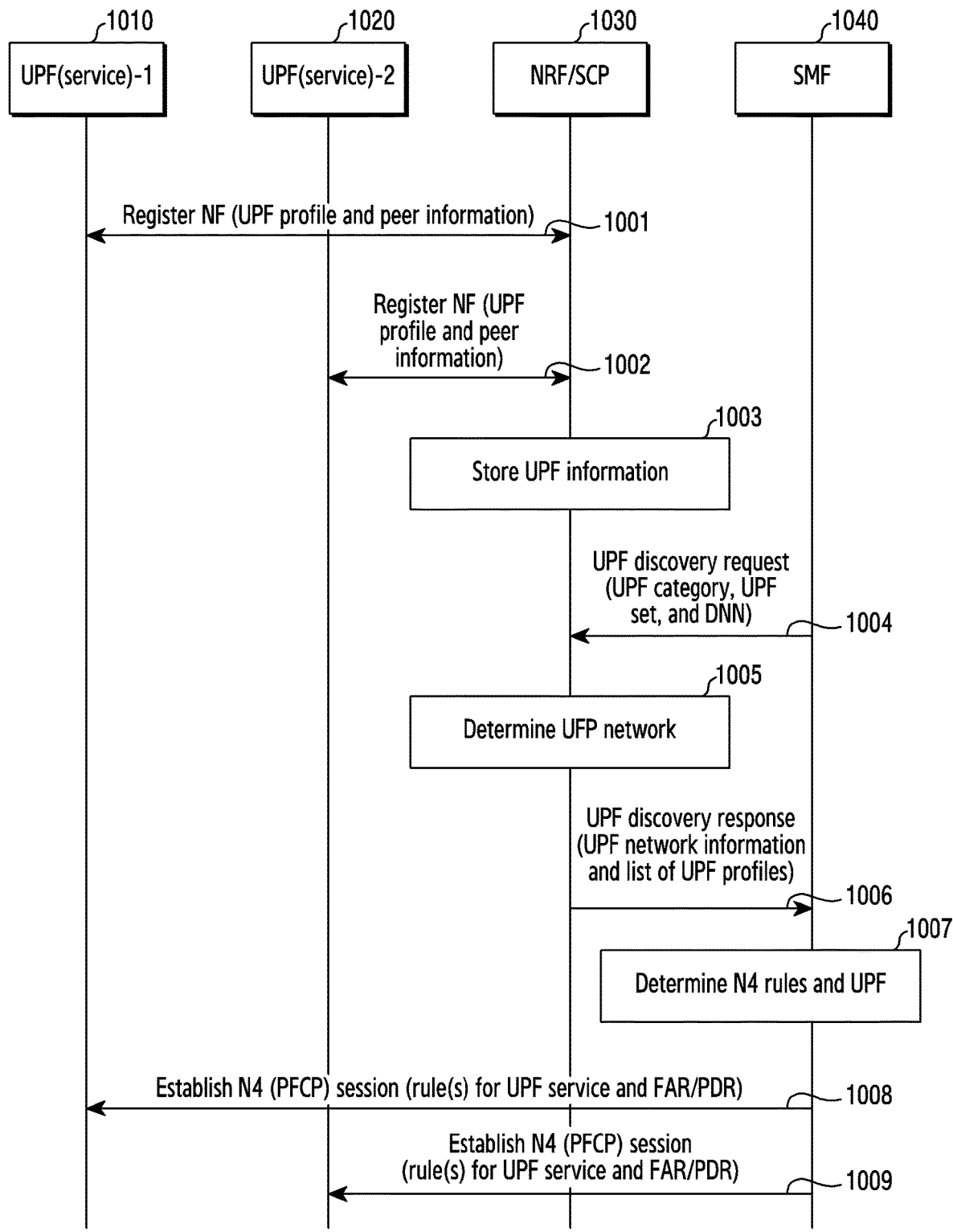
FIG. 10 illustrates a process using a combination of one or more packet processing functions required for a specific traffic packet in a wireless communication system according to various embodiments.

FIG. 10 illustrates a process using a combination of one or more packet processing functions required for a specific traffic packet in a wireless communication system according to various embodiments.

The embodiment of FIG. 10 may prevent complexity for management in the network from becoming high when the number of combinations of various packet processing functions provided by UPF instances is too great. At this time, a representative combination of packet processing functions may be standardized in consideration of a characteristic of traffic generally frequently generated and equally applied in various environments, and some combinations may be used according to settings of a service provider. A specific packet processing category (or group) includes an index of the category and one or more packet processing functions belonging to the corresponding category. The category is divided into a standardized category and a category that may be configured by settings of a service provider, and the standardized category uses some ranges of indexes (for example, indexes 0 to 7).

For example, a packet processing category to be standardized may be configured as shown in [Table 1] below.

TABLE 1

| Category Index | UPF Services |
| --- | --- |
| 0 | Packet Detection |
| 1 | Packet Detection + Forwarding |
| 2 | Packet Detection + Buffering |
| 3 | QoS Enforcement + Usage Reporting |
| 4 | Packet Detection + Usage Reporting |
| ... | |
| N | Packet Detection + QoS Enforcement + Usage Reporting + Buffering + Forwarding |

In step 1001, a first UPF (UPF-1) instance 1010 performs a UPF service registration process with an NRF/SCP 1030 and transmits an NF (UPF) profile of the first UPF (UPF-1) instance 1010 through a registration request message. The NF (UPF) profile may basically include an identifier of the first UPF (UPF-1) instance 1010, and may further include one or more pieces of UPF service information supported by the first UPF (UPF-1) instance 1010 according to various embodiments. If the first UPF (UPF-1) instance 1010 supports packet processing belonging to a specific category, an index of the category for which packet processing is supported by the first UPF (UPF-1) instance 1010 is included. If service provider-specific category packet processing is supported, an index of the service provider-specific category may be included, and a packet processing function belonging to the corresponding category may be specified. Further, the NF (UPF) profile may include information on a connection relationship with another UFP instance to which the first UPF (UPF-1) instance 1010 is connected to process traffic, that is, peer information. The connection relationship information, that is, peer information may specifically include one or more of an identifier of a UPF set which can be connected to the first UPF (UPF-1) instance 1010, an identifier of the UPF instance, a relationship (transmission/reception/bi-direction), and an IP address, and may be configured for each UPF (set or instance) which can be linked. Further, an identifier of the UPF set to which the UPF instance belongs and IP address(es) of UPF instance(s) may be included.

In step 1002, the second UFP (UPF-2) instance 1020 may perform a UPF service registration process with the NRF/SCP 1030, and the NF (UPF) profile may basically include an identifier of the second UPF (UPF-2) instance 1020 and may further include one or more pieces of UPF service information supported by the second UPF (UPF-2) instance 1020 according to various embodiments. If the second UPF (UPF-2) instance 1020 supports packet processing belonging to a specific category, an index of the category for which packet processing is supported by the second UPF (UPF-2) instance 1020 is included. If service provider-specific category packet processing is supported, an index of the service provider-specific category may be included, and a packet processing function belonging to the corresponding category may be specified. Further, the NF (UPF) profile may include information on a connection relationship with another UFP instance to which the second UPF (UPF-2) instance 1020 is connected to process traffic, that is, peer information. In addition, an identifier of the UPF set to which the UPF instance belongs and IP address(es) of UPF instance(s) may be included. The connection relationship information, that is, peer information may specifically include one or more of an identifier of a UPF set which can be connected to the second UPF (UPF-2) instance 1020, an identifier of the UPF instance, a relationship (transmission/reception/bi-direction), and an IP address, and may be configured for each UPF (set or instance) which can be linked.

In step 1003, the NRF/SCP 1030 stores information received from the UPF instances 1010 and 1020, marks an available UPF, and uses the same for UPF service selection and discovery processes occurring later. In FIG. 10, a response message which the NRF/SCP 1030 transmits to first UPF (UPF-1) instance 1010 and the second UPF (UPF-2) instance 1020 is omitted.

In step 1004, a consumer NF 1040 (for example, an SMF) performs a process of discovering and selecting a UPF instance with the NRF/SCP 1030 to receive a user plane packet processing service. Such a process may be triggered to establish a PDU session for a specific UE or triggered to acquire in advance information required for the corresponding process. In the embodiment of FIG. 10, the consumer NF 1040 (for example, the SMF) transmits a discovery request message including an index of a packet processing category required by the consumer NF to the NRF/SCP 1030. Further, a Data Network Name (DNN) or a slice to be a target may be specified, and if the consumer NF has the information when making the request, the corresponding request message may additionally include an identifier of a UPF set and an identifier of a UPF service set. In addition, if the requested UPF instance should be connected to the already selected UPF instance, the request message may include information on the UPF instance to be connected (the use of the connection relationship information, that is, peer information).

In step 1005, the NRF/SCP 1030 discovers a UPF network including at least one UPF instance for supporting UPF service(s) belonging to a category requested to be discovered. That is, the NRF/SCP 1030 determines a UPF network including at least one UPF instance that may support the UPF service requested to be discovered. This embodiment assumes that the NRF/SCP 1030 selects the UPF-1 instance 1010 and the UPF-2 instance 1020 and determines a UPF network including the UPF-1 instance 1010 and the UPF-2 instance 1020. Additionally, although not illustrated, it may be assumed that the NRF/SCP 1030 does not select a UPF-3 instance even though the UPF-3 instance that stores UPF information exists.

In step 1006, the NRF/SCP 1030 transfers information on the UPF service network determined in step 1005 to the consumer NF 1040. When two or more UPF instances supporting corresponding UPF service(s) are linked to each other unlike the discovery between general control plane NFs, information corresponding to a response of the NRF/SCP may include all of the information on the UPF instances and link information therebetween. The link information may include information on the connection (IP network or link) between UPF instances, a direction in which a packet is exchanged between UPF instances, and a sequence in a transmission path between UPF instances, and connection relationship information, that is, peer information received during the UPF service registration process may be used or information received through separate Operations and Management (OAM) may be used for the link between the UPF instance and discovery of the configuration of an optimal UPF instance.

In step 1007, the SMF 1040 generates an N4 rule to use the UPF service of the selected UPF-1 instance 1010.

That is, the SMF 1040 determines at least one UPF instance that may support the UPF service requested to be discovered. This embodiment assumes that the SMF 1040 determines the UPF-1 instance 1010 and the UPF-2 instance 1020 as at least one UPF instance that may support the UPF service. Additionally, although not illustrated, it may be assumed that the SMF 1040 does not determine a UPF-3 instance as at least one UPF instance that may support the UPF service even though the UPF-3 instance that stores UPF information exits.

In step 1008, the SMF 1040 transfers the generated N4 rule to the UPF-1 instance 1010. The N4 rule may contain information and rules required for a specific UPF service, and may include a packet detection rule for detecting a packet (or IP flow) as a target, a rule for an action for each UPF service (for example, in the case of QoS enforcement, a detailed parameter for QoS enforcement), and a rule for transferring a packet to another node (a linked UPF, a data network, or a RAN). Further, basic context of the corresponding session is included. Upon receiving the N4 rule, the UPF-1 instance 1010 stores the received N4 rule, transmits the response message to the SMF 1040 again, and performs a traffic processing operation using the received N4 rule and context. That is, the UPF-1 instance 1010 and the SMF 1040 exchange an N4 (PFCP) session establishment request message/response message including rule(s) for the UPF service and a Forwarding Action Rule (FAR)/Packet Detection Rule (PDR).

In step 1007, the SMF 1040 generates an N4 rule to use the UPF service of the selected UPF-2 instance 1020.

That is, the SMF 1040 determines at least one UPF instance that may support the UPF service requested to be discovered. This embodiment assumes that the SMF 1040 determines the UPF-1 instance 1010 and the UPF-2 instance 1020 as at least one UPF instance that may support the SUP service. Additionally, although not illustrated, it may be assumed that the SMF 1040 does not determine a UPF-3 instance as at least one UPF instance that may support the UPF service even though the UPF-3 instance that stores UPF information exits.

In step 1009, the SMF 1040 transfers the generated N4 rule to the UPF-2 instance 1020. The N4 rule may contain information and rules required for a specific UPF service, and may include a packet detection rule for detecting a packet (or IP flow) as a target, a rule for an action for each UPF service (for example, in the case of QoS enforcement, a detailed parameter for QoS enforcement), and a rule for transferring a packet to another node (a linked UPF, a data network, or a RAN). Further, basic context of the corresponding session is included. Upon receiving the N4 rule, the UPF-2 instance 1020 stores the received N4 rule, transmits the response message to the SMF 1040 again, and performs a traffic processing operation using the received N4 rule and context. That is, the UPF-2 instance 1020 and the SMF 1040 exchange an N4 (PFCP) session establishment request message/response message including rule(s) for the UPF service and a Forwarding Action Rule (FAR)/Packet Detection Rule (PDR).

Thereafter, when packet transmission/reception and information exchange for GTP-U tunneling or management between two UPF instances 1010 and 1020 are needed, additional signaling and information exchange between the two UPF instances 1010 and 1020 may be generated.

Meanwhile, FIG. 10 has described the process of registering information on the UPF instances 1010 and 1020 through the NRF/SCP 1030 and discovering and selecting the UPF instances 1010 and 1020 by the consumer NF 1040, and the use of a category for the UPF service during the process.

However, the use of the category for the UPF service may expand to the use of category information even in the process of exchanging UPF instance information during an N4 association process between the UPF instance and the SMF in FIG. 7 or 8 among various embodiments. That is, the UPF instance may transfer information on the category supported by the UPF instance during the process of establishing N4 association with the SMF to the SMF, and the SMF may discover the UPF instance that supports the category for processing traffic of a specific service on the basis of the information.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network repository function (NRF) entity in a mobile communication system, the method comprising:
    receiving, from a user plane function (UPF) entity, a network function (NF) register request message including a UPF profile of the UPF entity;
    storing the UPF profile, wherein the UPF entity is marked as available;
    receiving, from a session management function (SMF) entity which is a NF service consumer, a NF discovery request message including at least one of information on a NF service name, information on a NF type indicating a UPF, information on a NF type of the NF service consumer, information on a NF set identifier, or information on a NF service set identifier;
    determining the UPF entity based on the UPF profile and the NF discovery request message; and
    transmitting, to the SMF entity, a NF discovery response message as a response to the NF discovery request message, wherein the NF discovery response message includes information on the UPF entity.

2. The method of claim 1,
    wherein the information on the UPF entity is peer information which is information on a connection relationship with another UPF entity capable of handling traffic by connecting the UPF entity.

3. A method performed by a session management function (SMF) entity which is a network function (NF) service consumer in a mobile communication system, the method comprising:
    transmitting, to a network repository function (NRF) entity, a NF discovery request message including at least one of information on a NF service name, information on a NF type indicating a user plane function (UPF), information on a NF type of the NF service consumer, information on a NF set identifier, or information on a NF service set identifier; and
    receiving, from the NRF entity, a NF discovery response message as a response to the NF discovery request message, wherein the NF discovery response message includes information on a UPF entity,
    wherein the UPF entity is based on a UPF profile and the NF discovery request message, and
    wherein the UPF entity is marked available.

4. The method of claim 3,
    wherein the information on the UPF entity is peer information which is information on a connection relationship with another UPF entity capable of handling traffic by connecting the UPF entity.

5. A network repository function (NRF) entity in a mobile communication system, the NRF entity comprising:
    a transceiver; and
    at least one processor coupled with the transceiver and configured to:
        receive, from a UPF entity, a network function (NF) register request message including a UPF profile of the UPF entity,
        store the UPF profile, wherein the UPF entity is marked as available,
        receive, from a session management function (SMF) entity which is a NF service consumer, a NF discovery request message including at least one of information on a NF service name, information on a NF type indicating a UPF, information on a NF type of the NF service consumer, information on a NF set identifier, or information on a NF service set identifier,
        determine the UPF entity based on the UPF profile and the NF discovery request message, and
        transmit, to the SMF entity, a NF discovery response message as a response to the NF discovery request message, wherein the NF discovery response message includes information on the UPF entity.

6. The NRF entity of claim 5,
    wherein the information on the UPF entity is peer information which is information on a connection relationship with another UPF entity capable of handling traffic by connecting the UPF entity.

7. A session management function (SMF) entity which is a network function (NF) service consumer in a mobile communication system, the SMF entity comprising:
    a transceiver; and
    at least one processor coupled with the transceiver and configured to:
        transmit, to a network repository function (NRF) entity, a NF discovery request message including at least one of information on a NF service name, information on a NF type indicating a user plane function (UPF), information on a NF type of the NF service consumer, information on a NF set identifier, or information on a NF service set identifier, and
        receive, from the NRF entity, a NF discovery response message as a response to the NF discovery request message, wherein the NF discovery response message includes information on a UPF entity,
    wherein the UPF entity is based on a UPF profile and the NF discovery request message, and
    wherein the UPF entity is marked available.

8. The SMF entity of claim 7,
    wherein the information on the UPF entity is peer information which is information on a connection relationship with another UPF entity capable of handling traffic by connecting the UPF entity.

* * * * *